3,312,744
PRODUCTION OF HYDROXY FUNCTIONAL POLYMERS
James A. Farr, Jr., Charles R. McIntosh, and William D. Stephens, Huntsville, Ala., assignors to Thiokol Chemical Corporation, Bristol, Pa., a corporation of Delaware
No Drawing. Filed Aug. 27, 1962, Ser. No. 219,781
5 Claims. (Cl. 260—635)

This invention relates to hydroxy functional polymers, and more particularly to a process for making low molecular weight hydroxy functional polymers.

Polymers in which the functional hydroxyl groups are the only non-hydrocarbon part of the polymer are rare, despite the many hydroxy functional polymers known. The most common hydroxy functional polymers are polyesters produced by the reaction of polybasic acids with polyols. In such polymers, the polymer chain is not purely hydrocarbon, but contains a number of ester groups. While there are many known hydrocarbon polymers, with few exceptions they are long-chain, high molecular weight, non-functional polymers. A means of converting these long-chain, non-functional polymers into short-chain, hydroxy functional polymers has long been desired. Such polymers, with molecular weight in the 200–400 range can be cured to rigid or elastomeric solids with a number of available curing agents.

It has been found, in accordance with the present invention, that long-chain, non-functional olefinic polymers and copolymers can be converted to short-chain hydroxy functional polymers by ozonization followed by reduction of the ozonide. Ozonization of the high-polymer starting material is carried out by passing a stream of ozone in a gaseous carrier through a solution of the starting material at room temperature. The resulting ozonide is subsequently treated with a suitable reducing agent, such as lithium aluminum hydride, to give hydroxy functional liquid polymers.

In general, any olefinic polymers or copolymers having unsaturation in the primary chain structure may be converted to hydroxy functional polymers by the process of this invention. Unsaturation must occur in the primary chain, rather than solely on side chains, in order that the long primary chain can be cleaved into short-chain fragments. Production of useful polymers requires a starting material of certain minimum chain length, but no theoretical upper limit exists for the chain length of the starting material. Certain practical considerations, however, impose a limit on the chain length of the starting material. Because the ozonization reaction is best carried out in the liquid phase, the starting material should be soluble in a suitable reaction medium. Organic solvents, particularly halogenated hydrocarbons, which readily dissolve high polymers, but which do not react with ozone are suitable reaction media. As chloroform is a preferred reaction medium, the solubility of the high-polymer starting material in chloroform is the principal factor in setting the upper limit of chain length of the starting material. Long-chain polymers with molecular weights in the 1–2 million range may be converted to short chain hydroxy functional liquid polymers by the process of the present invention.

Other considerations will also have an influence on the choice of starting material. As is well known, the structure of a polymer has a significant effect upon the physical properties of the elastomer or resin made from the polymer. Therefore, a starting material will be chosen which will result in the desired structure in the final polymer. The structure of the hydroxy functional polymers produced by the process of the present invention will be determined primarily by the structure of the starting material. If the starting material is a highly stereoregular polybutadiene, for example, the polymer resulting from conversion will be a hydroxyl terminated polybutadiene of the same high stereoregularity. Polymers of this type are described in greater detail in copending application S.N. 219,780 filed August 27, 1962, and now abandoned.

If the starting material is a polybutadiene of mixed cis and trans configuration, however, the resulting hydroxyl polymer will reflect the mixed configuration, but not necessarily in the same proportions as in the starting material. The structure of polymers converted from starting material of mixed stereo configuration will be in part determined by the relative proportions of cis and trans bonds to which ozone is added. This in turn will depend upon the reactivities of the two types of bonds under the reaction conditions and the proportions of the two in the starting material. In general, there is a tendency to greater attack of the trans configuration, and a consequent slightly greater proportion of cis configuration in the resulting hydroxyl polymer.

While the process of the present invention is most advantageously applied to the conversion of butadiene polymers to hydroxyl terminated polymers, as described in copending application S.N. 219,780, it is apparent that it may be applied to any olefinic polymer having unsaturation in the primary chain. The type and location of the hydroxyl groups in the resulting hydroxy polymers will be determined by the type and location of the double bonds attacked by ozone. In the case of polyisoprene, for example, the double bonds occur between methyl substituted carbon atoms and adjacent unsubstituted carbon atoms. Ozonization and reduction will produce a terminal primary hydroxyl group attached to the unsubstituted carbon atom and a secondary hydroxyl group attached to the methyl substituted carbon atom—which will be the second carbon atom in the resulting polymer chain.

The polymer resulting from conversion of polydimethylbutadiene will have only secondary hydroxyl groups attached to the second carbon atom from each end of the polymer chain. If the polymer chain of the starting material has pendant unsaturated chains, as in a polybutadiene in which 1,2 addition has taken place, a polyfunctional hydroxyl polymer will be produced. In the specific case of a polybutadiene having a large percentage of 1,2 addition, all of the hydroxyl groups produced in the conversion will be primary hydroxyl groups, occurring at the terminal of the primary and pendant chains. Such polymers are particularly useful as cross-linking agents for use with difunctional polymers cured with difunctional curing agents.

The process of the present invention comprises two essential steps: ozonization and reduction. Purification of the resulting polymer is necessary, as is common in all polymer processes. Since the two essential steps are the same for all polymers being converted, a generalized procedure will be described rather than listing a number of repetitious examples. A detailed example of the process as used in the preparation of hydroxyl terminated polybutadiene polymers is given in copending application S.N. 219,780.

*Ozonization*

A stream of ozonized oxygen containing from 1 to 3 percent ozone is passed in the form of minute, dispersed bubbles through a chloroform solution of the high-polymer starting material at room temperature for a period of 45 to 75 minutes. The volume of ozonized oxygen introduced into the solution during this period is such that one mole of ozone is introduced for each two to six unsaturated repeating units of the polymeric starting material.

The chloroform solvent is removed from the resulting ozonide by vacuum evaporation, the crude ozonide is cautiously stirred with ethyl ether and the mixture is filtered to remove insoluble matter.

Reduction

The filtered ether solution of the ozonide from the preceding step is cooled to −10° C. and maintained between −10 and −5° C. while an ether solution of lithium aluminum hydride is added dropwise during a period of 1½ hours until an excess of the reducing agent is present. The reaction may be monitored to determine when an excess has been added, or—as the simplest procedure—an amount of reducing agent approximately 20 percent in excess of that required to react with the theoretical amount of ozonide produced in the ozonization step may be dissolved in ether and added as above.

When the excess of reducing agent is present, the reaction mixture is warmed or allowed to warm to room temperature (25° C.) and is then heated under reflux conditions for 4 to 8 hours. The refluxed reaction mixture is then cooled to room temperature and the excess lithium aluminum hydride is decomposed by cautious dropwise addition of water.

Purification

Any of several standard recovery and purification processes applicable to hydroxy functional polymers may be employed at this stage. The following procedure is an example of standard processes as employed in laboratory or pilot plant scale.

The ether layer from the preceding step containing the dissolved polymeric material is decanted and washed two or more times with water by decantation. Excess and dissolved water is removed by azeotropic distillation with benzene. Solvent is removed from the resulting dried solution by vacuum evaporation, the polymeric residue is vigorously stirred with acetone and filtered to remove insoluble matter. The resulting filtrate is evaporated to dryness under vacuum and the polymeric residue is dissolved in benzene. Hydroxy functional polymer is recovered by precipitation from the benzene solution with petroleum ether and is further purified by vacuum evaporation of entrapped solvent, precipitating agent and low-boiling polymeric fractions.

What is claimed is:

1. A process for the conversion of a high-molecular weight olefinic polymer having a plurality of olefinic linkages in its primary chain to hydroxy polyfunctional polymer having a molecular weight in the range from 200 to 400, comprising the steps of
    (a) converting between 15 and 50 percent of the olefinic bonds of said olefinic polymer to ozonide linkages by passing ozone at a concentration of 1 to 3 percent in a non-reactive gas through a room temperature solution of said olefinic polymer in a halogenated hydrocarbon solvent, the introduction of the ozone into the solution being at the rate of one mole of ozone for each two to six unsaturated repeating units of the polymer, the ozone treatment being for a period of 45 to 75 minutes,
    (b) removing said halogenated hydrocarbon solvent from the polyozonide thus produced by vacuum evaporation,
    (c) dissolving said polyozonide in ethyl ether, and filtering the solution to remove insoluble matter,
    (d) adding a light metal hydride in ether solution to the thus produced ether solution dropwise during a period 1½ hours until an excess thereof is present, the solution during this period being maintained at a temperature between −10 and −5° C. during the addition followed by heating under reflux conditions between 4 and 8 hours to reductively cleave said ozonide linkages, decomposing any of the excess hydride by the dropwise addition of water, and
    (e) recovering hydroxy functional polymer as a product of said process.

2. A process for the conversion of a high-molecular weight olefinic polymer having a plurality of olefinic linkages in its primary chain to hydroxy polyfunctional polymer having a molecular weight in the range from 200 to 400, comprising the steps of
    (a) converting between 15 and 50 percent of the olefinic bonds of said olefinic polymer to ozonide linkages by passing ozone at a concentration of from 1 to 3 percent in a non-reactive gas through a room temperature solution of said olefinic polymer in a halogenated hydrocarbon solvent, the introduction of the ozone into the solution being at the rate of one mole of ozone for each two to six unsaturated repeating units of the polymer, the ozone treatment being for a period of from 45 to 75 minutes,
    (b) partially purifying the polyozonide thus produced by removing the halogenated hydrocarbon solvent by vacuum evaporation, dissolving said polyozonide in ethyl ether and filtering said ether solution to remove insoluble matter,
    (c) reductively cleaving the ozonide linkages of said polyozonide by the incremental addition of a predetermined excess of a light metal hydride in ethyl ether solution to the ether solution of polyozonide dropwise during a period of 1½ hours until an excess thereof is present, while maintaining the temperature of said solution between −10 and −5° C.,
    (d) heating the thus produced reaction mixture at its boiling point under reflux conditions for a period of from 4 to 8 hours to complete the reductive cleavage,
    (e) decomposing the excess unreacted light metal hydride by cautious addition of water at room temperature, and
    (f) recovering hydroxy functional polymer as a product of said process.

3. A process for the conversion of a high-molecular weight olefinic polymer having a plurality of olefinic linkages in its primary chain to hydroxy polyfunctional polymer having a molecular weight in the range from 200 to 400, comprising the steps of
    (a) converting between 15 and 50 percent of the olefinic bonds of said olefinic polymer to ozonide linkages by passing ozone at a concentration of 1 to 3 percent in a non-reactive gas through a room temperature solution of said olefinic polymer in a halogenated hydrocarbon solvent, the introduction of the ozone into the solution being at the rate of one mole of ozone for each two to six unsaturated repeating units of the polymer, for a period of 45 to 75 minutes,
    (b) removing said halogenated hydrocarbon solvent from the polyozonide thus produced by vacuum evaporation,
    (c) dissolving said polyozonide in ethyl ether, and filtering the solution to remove insoluble matter,
    (d) adding a predetermined excess of a light metal hydride in ether solution in small increments to the thus produced ethyl ether solution during a period of 1½ hours while maintaining the temperature of said solution between −10 and −5° C.,
    (e) heating the thus produced reaction mixture at its boiling point under reflux conditions between 4 and 8 hours,
    (f) decomposing the excess light metal hydride by cautious addition of water at room temperature, and
    (g) recovering hydroxy functional polymer as a product of said process.

4. A process for the conversion of a high-molecular weight olefinic polymer having a plurality of olefinic linkages in its primary chain to hydroxy polyfunctional polymer having a molecular weight in the range from 200 to 400, comprising the steps of
    (a) converting between 15 and 50 percent of the olefinic bonds of said high molecular weight polymer to ozonide linkages by passing ozone in the form of minute dispersed bubbles at a concentration of 1 to 3 percent in a non-reactive gas through a room temperature chloroform solution of said polymer, the chloroform acting as non-reactive solvent, the introduction of the ozone into the solution being at the rate of one mole of ozone for each two to six unsaturated repeating units of the polymer, removing the chloroform from the solution by vacuum evaporation, cautiously stirring the remaining solution with ethyl ether and then filtering the solution to remove insoluble matter, the ozone treatment being for a period of 45 to 75 minutes, (b) reductively cleaving said ozonide linkages of the polyozonide thus produced by the addition of an ether solution of a light metal hydride to the ethyl ether solution of said polyozonide dropwise during a period of 1½ hours until an excess thereof is present, the polyozonide during this period being maintained at a temperature between −10 and −5° C. during the addition followed by heating under reflux conditions between 4 and 8 hours, decomposing any of the excess hydride by the cautious dropwise addition of water, and (c) recovering hydroxy functional polymer as a product of said process.

5. The product of the process of claim 4.

References Cited by the Examiner
UNITED STATES PATENTS 2,692,892   1/1951   Hillyer _____ 260—635
3,055,952   9/1962   Goldberg _____ 260—635

OTHER REFERENCES

Greenwood, Journal of Organic Chemistry, vol. 20, 1955, pages 803–807.

Sousa et al., Journal of Organic Chemistry, vol. 25, 1960, pages 108–111.

LEON ZITVER, *Primary Examiner.*

H. G. MOORE, *Examiner.*

M. B. ROBERTO, G. MILWICK, J. E. EVANS,
*Assistant Examiners.*